United States Patent
Knapp et al.

(10) Patent No.: US 8,018,234 B2
(45) Date of Patent: Sep. 13, 2011

(54) ELECTRON SOURCE FOR A VACUUM PRESSURE MEASURING DEVICE

(75) Inventors: Wolfram Knapp, Möser (DE); Martin Wüest, Malans (CH)

(73) Assignee: Inficon GmbH, Bad Ragaz (CH)

( * ) Notice: Subject to any disclaimer, the term of this patent is extended or adjusted under 35 U.S.C. 154(b) by 265 days.

(21) Appl. No.: 12/516,375

(22) PCT Filed: Nov. 23, 2007

(86) PCT No.: PCT/CH2007/000588
§ 371 (c)(1),
(2), (4) Date: May 27, 2009

(87) PCT Pub. No.: WO2008/067681
PCT Pub. Date: Jun. 12, 2008

(65) Prior Publication Data
US 2010/0066380 A1   Mar. 18, 2010

(30) Foreign Application Priority Data
Dec. 6, 2006   (CH) ...................................... 1983/06

(51) Int. Cl.
*G01L 21/32*   (2006.01)
*H01J 49/26*   (2006.01)

(52) U.S. Cl. ......... 324/462; 324/460; 324/464; 250/305
(58) Field of Classification Search .............. 324/460, 324/464, 454, 459; 250/305
See application file for complete search history.

(56) References Cited

U.S. PATENT DOCUMENTS

2005/0184735 A1 *   8/2005   Arnold et al. ................. 324/464
* cited by examiner

*Primary Examiner* — Vincent Q Nguyen
(74) *Attorney, Agent, or Firm* — Notaro, Michalos & Zaccaria P.C.

(57) ABSTRACT

A vacuum pressure measuring device with an electron source has a reaction zone for forming ions by impact ionization, wherein the electron source communicates with the reaction zone via a passage for the electrons. The electron source is surrounded by an insulating housing with a vacuum chamber, and a partition part is designed as a membrane carrier, carrying a nanomembrane at least in one section, the membrane separating the vacuum chamber from the outer region in a gastight manner and being at least partially designed to be electron-permeable. The vacuum chamber has a cathode for the emission of electrons. In the region of and/or on the nanomembrane, an anode arrangement is provided such that electrons are conducted against the nanomembrane and at least partially through it. The nanomembrane abuts the vacuum chamber of the vacuum pressure measuring device.

32 Claims, 5 Drawing Sheets

ELECTRON SOURCE FOR A VACUUM PRESSURE MEASURING DEVICE

FIELD AND BACKGROUND OF THE INVENTION

The invention relates to a vacuum pressure measuring device with an electron source and with a reaction zone for the formation of ions through impact ionization.

The invention relates, in particular, to vacuum pressure measuring engineering or to vacuum pressure measuring devices based on the ionization of gas molecules for the measurement of total pressure (ionization manometer) as well as also for the measurement of partial pressure (mass spectrometer).

For the ionization of the gas molecules in a vacuum pressure measuring device for the measurement of total pressure (ionization manometer) as well as also for the measurement of partial pressure (mass spectrometer) an electron source is necessary, located in the immediate proximity to the ionization volume as is known in prior art. Under measuring conditions in vacuum pressure ranges from less than 1 Pa ($10^{-2}$ mbar), and with high pressure measuring tubes 1 to 2 decades higher, the electron source has the task of emitting electrons into the ionization volume. For the electron emission primarily hot cathodes (thermionic emission) have so far been utilized. Electron sources with field emitters (field emission) furthermore have also been proposed for vacuum pressure measurements, which, with respect to the conditions of application and/or to the production expenditure, have so far not become commercially widely established.

Due to the principle involved, interaction between the electron source and the ionization or measuring volume is necessary in such vacuum pressure measuring cells. Fast venting of the arrangement, for example when opening a process vacuum chamber for loading workpieces to be treated, is especially problematic since the oxygen intrusion leads to the destruction of the active, electron emitting thermionic cathode (cf. incandescent lamp). Special protective measures against this must be taken each time. Further problems are generated in case of contaminations, especially through forepumps contaminated with operating fluid, such as sliding vane rotary pumps. Aggressive process and etching gases frequently utilized today, such as for example silane and gases based on chlorine and fluorine, are also highly problematic. When using very aggressive process gases, it is therefore customary to protect vacuum measuring devices based on ionization, which are necessary for the base pressure measurement, against the process with a valve, such as for example an all-metal vane, which leads to considerable additional costs and makes the application feasibilities difficult and limited.

SUMMARY OF THE INVENTION

The present invention therefore addresses the problem of eliminating the disadvantages of prior art. The present invention addresses in particular the problem of protecting the electron source of a vacuum pressure measuring device against the effects of vacuum processes in which such measuring devices are applied. A protection is preferably also to be realized against a venting of the vacuum process chambers and, thus, also of the measuring device such that the electron source is not impermissibly contaminated or even destroyed or that complex and expensive additional electronic protection measures are necessary. Sensitive vacuum processes are also to be protected against damaging emissions of the measuring cell itself and in particular such which emanate from the electron source of the measuring cell. The measuring cell, moreover, is also to be economically producible.

The problem is solved according to the independent claims in the vacuum pressure measuring device according to the species with an electron source. The dependent patent claims refer to advantageous further embodiments of the invention.

The vacuum pressure measuring device includes an electron source with a reaction zone for the formation of ions through impact ionization, wherein the electron source communicates with the reaction zone via a passage opening for the electrons. The electron source is encompassed by an insulating housing with a vacuum volume and a wall portion is realized as a membrane carrier which supports at least in a subregion a nanomembrane which separates the vacuum volume against the outside region such that it is gas-tight and at least to some proportion is formed electron-permeable, wherein in this vacuum volume a cathode is located for the emission of electrons and that in the proximity of and/or on the nanomembrane an anode configuration is provided such that electrons are guided toward the nanomembrane and at least partially through it, with the nanomembrane bordering the vacuum volume of the vacuum pressure measuring device.

In the vacuum pressure measuring device according to the invention the electron source is thus eliminated by decoupling of electron source and ionization or measuring volume through an effective vacuum-technique separation of both regions while maintaining the ionization principle.

The separation is attained thereby that the electron source is vacuum-tight encapsulated in a housing and between electron source and ionization or measuring volume a nanomembrane is located such that electrostatically accelerated electrons (electron beam) fly through the nanomembrane. On the other hand, this nanomembrane prevents the gas and ion exchange between electron source region and ionization or measuring volume.

A significant advantage of the separation of electron source and ionization or measuring volume by means of nanomembrane, however, is that in both volume regions very different physical and chemical conditions, in particular also vacuum conditions, can be separately maintained or set even during a vacuum total or partial pressure measurement, wherefrom novel or expanded application feasibilities for such vacuum pressure measuring devices result.

For the generation and maintenance of ballistic electron motion (electron beam), in the housing of the electron source vacuum conditions can be maintained with a pressure in the range of $10^{-1}$ mbar to $10^{-8}$ mbar, preferably within the range of $10^{-3}$ mbar to $10^{-6}$ mbar, optionally utilizing the pumping effect of getter material, in particular NEGs (non-evaporable getter). The electrode configuration is additionally to be formed such that maximal electron transmission through the nanomembrane is attained, preferably using suitable cathode and anode materials, configurations and geometries.

The nanomembrane is permeable to appropriately accelerated electrons. At the same time, it must be gas-tight, thus it must reliably separate, and thereby protect, the evacuated housing with the sensitive components, such as cathodes, for the generation of the electrons against external effects and yet be sufficiently permeable for accelerated electrons. The pressure difference, which the membrane in the extreme case must be able to withstand, can herein extend to the approximately 1.5-fold atmospheric pressure, if, for example, a process chamber with the vacuum pressure measuring device is very rapidly vented. Correspondingly high demands are made of this nanomembrane. Materials suitable for this membrane are: metal foils and preferably ceramic membranes, preferably nitride (for example $Si_3N_4$) and oxide ceramics, in particular aluminum oxide ($Al_2O_3$), zirconium oxide ($ZrO_2$) and yttrium oxide ($Y_2O_3$) since these materials are especially temperature and etch resistant. Possible are also mixed forms of the ceramics. The use of α-aluminum oxide or preferably sapphire or mixed forms thereof is advantageous.

When using a metal foil as nanomembrane (5), such comprises advantageously a nickel, aluminum, copper or precious metal foil or alloys thereof. A very cost-effective embodiment comprises that the nanomembrane (5) is realized of a precious metal foil, preferably of the same material as the housing wall (42) of the vacuum measuring device.

The thickness of the membrane is in the range of 25 to 500 nm, preferably in the range of 100 to 200 nm and is vacuum-tight. The areas can herein be in the range of 0.1 to 40.0 mm². Especially suitable areas are in the range of 0.1 to 1.0 mm², preferably in the range of 0.3 to 0.7 mm². Suitable values are, for example in the case the area is square, 0.1×0.1 mm² to 1.0×1.0 mm², preferably square of 0.3×0.3 mm² to 0.5×0.5 mm², or circular with a diameter of 0.3 mm to 0.7 mm or also rectangular with the narrow side in the preferred dimensions 0.3 mm to 0.5 mm with lengths of up to a few centimeters depending on the application requirement adapted to the geometry of the utilized electron emitters or cathodes. Apart from the prior listed preferred dimensions, in certain cases it is possible with elongated band-shaped configurations to increase the width up to maximally 2 mm and areas up to maximally 40 mm². The dimensions are also adapted as a function of the material and of the thickness of the nanomembrane, wherein the maintenance of the vacuum tightness under operating conditions is an important dimensioning criterion. In addition, it must be ensured that the membrane can withstand the atmospheric pressure which obtains during the venting of the system and is not destroyed. The thickness and the dimensions of the material utilized must be carefully dimensioned accordingly. It is advantageous if the dimensioning is carried out such that the extension in one direction under such loading through the venting is maximally 0.7 mm, preferably maximally 0.5 mm. It is sufficient for the stability of the nanomembrane against atmospheric pressure if this membrane in one dimension has a maximal width below approximately 0.7 mm (width as a function of the nanomembrane thickness). The length in this case can be adapted as desired, that is to the application task, for example for a line emitter with the length of the anode grid in a Bayard-Alpert gauge (BAG). In this case the entire area can consequently also be greater than 40 mm².

The electrons are accelerated away from the electron emitter or the cathode with an acceleration voltage against the membrane window such that they have sufficient energy in order to penetrate effectively the membrane with appropriate efficiency. As the anode serves a grid configuration in front of the membrane or the membrane itself. The acceleration voltage between cathode and anode is in the range of a few kV to a few 10 kV, preferably in the range of 5 kV to 50 kV and in particular in the range of preferably 10 kV to 50 kV. It is selected, for example, as a function of the thickness of the membrane and of the material, preferably a ceramic, such that an electron transmission of more than 90% is attained. For optimization of the acceleration voltage, this voltage should be so high that the electron transmission is high enough (more than 90%) in order for the losses in the nanomembrane to remain low since the absorbed energy must be removed as lost heat. On the other hand, the acceleration voltage $V_E$ for the extraction and transmission of the electrons through the nanomembrane should not be higher than necessary so that the ionization probability does not markedly decrease and the expenditure and complexity for the anode voltage supply $V_A$ remains limited.

The production of the nanomembrane takes place by etching from the materials $Si_3N_4$, $SiO_2$ or SiC materials, such as are known in prior art. Such examples are described in: Friedemann Völklein, Thomas Zetterer "Einführung in die Mikrosystemtechnik—Grundlagen and Praxisbeispiele" Friedr. Vieweg & Sohn Verlagsgesellschaft mbH, Braunschweig/Wiesbaden, August 2000 (ISBN 3-528-03891-8).

An advantageous effect of the invention is the prevention of gas or ion-based interactions between the electron source region and the ionization or measuring region. This is the prerequisite for the protection of the electron source against the loading during fast venting, protection of the electron source against the effects of the vacuum process, in particular when using extremely aggressive etching gases: the use of sensitive thermionic cathodes and field emitters becomes possible, protection of the vacuum process against effects of the electron source: use of cost-effective and highly efficient CNT field emitters (Carbon Nanotube) becomes possible. This is especially important in the semiconductor fabrication, which is moving toward ever finer structures and therewith requires ever higher requirements of process purity. Contamination of the process through electron source-side nanoparticles, such as for example particles originating from CNTs or catalyst metal nanoparticles, is prevented through the nanomembrane. This membrane is only permeable to accelerated electrons.

It thus becomes feasible to utilize cost-effective and more powerful and therewith efficient cathodes. It is even feasible to utilize more powerful cathodes, such as are known from vacuum tube technology, in particular from television tube technology (CRT) which, however, are sensitive to oxygen (poisoning or destruction of the cathode), for example during the venting of the vacuum process installation or of the vacuum pressure measuring device. Such cathodes for CRTs are produced in large piece numbers cost-effectively and with high constant quality. Especially suitable are also field emission cathodes, in particular of the type microtip or carbon nanotube (CNT). Especially suitable are also nanostructured field emission surfaces, such as a structured field emission film, which is deposited on a cathode carrier, or such that the surface on the solid material of the carrier is structured and is preferably comprised of a high-grade steel. A field emission cathode of this type is disclosed in Patent Application US 2006/0202701 A1 and its content constitutes an integral part of the present application.

The various features of novelty which characterize the invention are pointed out with particularity in the claims annexed to and forming a part of this disclosure and are entirely based on the priority applications Swiss Patent Application No. 1983/06 filed Dec. 6, 2006 and PCT/CH2007/000588 filed Nov. 23, 2007, which is incorporated here by reference.

BRIEF DESCRIPTION OF THE DRAWINGS

In the following the invention will be described schematically and by example in conjunction with Figures.

In the drawing depict.

DESCRIPTION OF THE PREFERRED EMBODIMENTS

Preferred embodiments of the electron source 1 according to the invention will be described in the following in greater detail and by example in conjunction with FIGS. 1 to 7. The electron source 1 comprises an insulating housing 6, for example of a ceramic, which encompasses a vacuum volume 7 and on one side on the housing wall includes a nanomembrane 5 of thickness $d_n$ and the dimensions $d_1$ with square, circular or rectangular (therein in the second side dimension freely selectable) membrane embodiment, which separates the vacuum volume 7 gas-tight from the surrounding. The surrounding is a further vacuum zone which forms a portion of a vacuum pressure measuring device or of a mass spectrometer, which, in order to fulfill its measuring task, communicates with a vacuum chamber in which a vacuum process takes place. The membrane 5 is advantageously disposed on a membrane carrier 4 which advantageously can directly form a portion of the wall of the housing 6. The vacuum within the housing 6 is advantageously maintained by a getter 8, in order to be able to maintain a good and stable vacuum, preferably better than $10^{-6}$ mbar. The getter 8 can be disposed directly within the housing 6 or outside of the housing 6 in an encapsulated separate volume which is connected through an opening with the vacuum volume 7. The dimensions of the housing are in the range of a few mm to a few cm and is thereby compactly realized such that it is applicable as a module. It is also possible to pump down the vacuum volume separately, which, however, is more complex and intensive. In this case the housing 6 includes a connection 100 or a connection with a vacuum valve 102 with a vacuum pump system 104 disposed thereon, preferably with a turbomolecular pump, for the continuous or discontinuous maintenance of the vacuum conditions. In this case a getter 8 is no longer necessary.

Within the housing 6 is disposed a cathode 2, which under sealing is led through a feedthrough 10 with terminal contacts through the housing wall in order to be able to connect this wall with an electric feed. The cathodes 2 can be realized variously. Opposite the cathode 2, spaced apart from it at distance a, a1, in the region of the membrane 5 is disposed an anode 3, which, in turn, is connected to a led-out terminal contact 11. The anode 3 can encompass the membrane 5 or is formed as a grid structure, which is disposed across the membrane surface, wherein the anode 3 advantageously serves also for removing the lost heat from the membrane 5. By applying a positive voltage to the anode 3 in the range of kilovolts with respect to the cathode 2, electrons are accelerated from the cathode 2 in the direction of anode 3 and are driven through the membrane 5, whereby these electrons become available outside of the housing 6 for the desired ionization processes in the vacuum pressure measuring devices.

Figure 1:
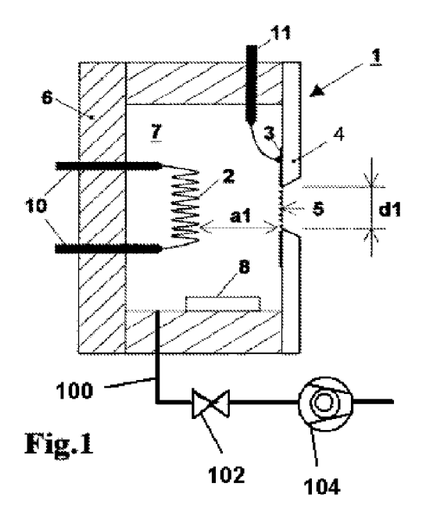
FIG. 1 schematically and in cross section an electron source according to the invention with a directly heated thermionic cathode, disposed within the housing, FIG. 2 schematically and in cross section an electron source according to the invention with an indirectly heated thermionic cathode, disposed within the housing, FIG. 3 schematically and in cross section an electron source according to the invention with an electron source configuration with a field emitter cathode, an extraction grid and an anode connected in triode configuration, which is disposed within the housing, FIG. 4 schematically and in cross section an electron source according to the invention with an electron source configuration with a field emitter cathode, and an anode connected in diode configuration, which is disposed within the housing, FIG. 5 a detail segment of the diode configuration according to FIG. 4 with microtip field emitter cathode, FIG. 6 a detail segment of the diode configuration according to FIG. 4 with field emitter cathode realized as CNT field emitter, FIG. 7 a detail segment of the diode configuration according to FIG. 4 with field emitter cathode realized as a nanostructured surface or as a structured applied field emitter thin film, FIG. 8 an ionization total pressure measuring cell with electron source disposed laterally on the housing wall of the measuring cell, FIG. 9 an ionization total pressure measuring cell with electron source disposed within the measuring cell, FIG. 10 an ionization total pressure measuring cell with electron source disposed within the measuring cell, in which the housing of the electron source includes an opening connecting the vacuum volume of the electron source with the vacuum volume of the total pressure measuring cell, FIG. 11 an ionization total pressure measuring cell with elongated electron source disposed laterally on the housing wall of the measuring cell, and with deceleration grid, FIG. 12 a quadrupole mass spectrometer with electron source disposed radially with respect to its longitudinal axis and laterally of the reaction zone of the mass spectrometer.

The cathode 2 can be formed in various manner and consequently also the cathode-anode configuration. FIG. 1 shows an electron source with a hot cathode or a thermionic cathode 2 as the electron emitter disposed spaced apart from the anode 3 and the membrane 5 by a1. The distance a1 is herein slightly greater, also in order to keep the thermal loading of the membrane 5 within limits. In thermionic cathodes 2 notice must be paid specifically to thermal loading in the dimensioning of the membrane 5 with the membrane carrier 4.

Figure 2:
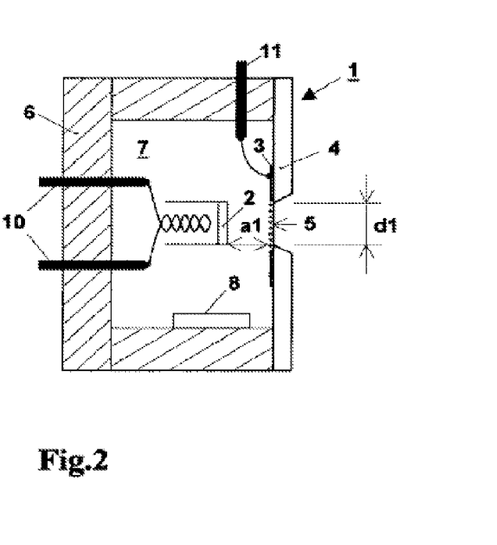

A further embodiment of a thermionic cathode 2 is depicted in FIG. 2 as an indirectly heated, high-efficiency cathode with surface emitter. The cathode-anode distance a1 can here also be slightly lower.

Figure 3:
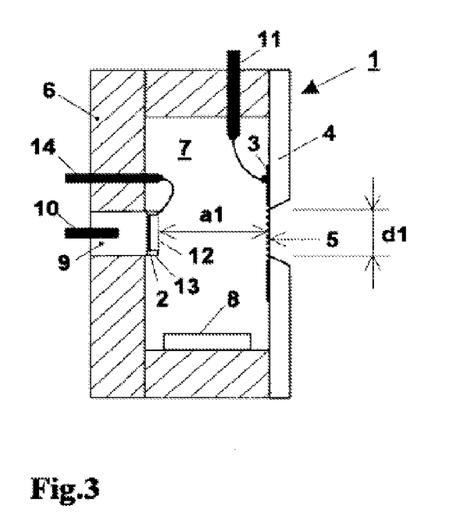

FIG. 3 shows the cathode implemented as a field emitter, for example as a field emitter array. The field emitter is herein disposed on a cathode carrier 9 or implemented thereon. In front of the field emitter advantageously a control grid 12 is disposed, which is positioned under definition at a short distance with a spacer 13 in front of the areally disposed field emitter. The control grid 12 serves also as an extraction grid for the extraction of the electrons and is connected with an electric terminal 14 which is also led to the outside for activation. This configuration with the cathode 2, the grid 12 and the anode 3 forms a triode configuration. In this case the distance a1 between cathode 2 with grid 12 from the anode 3 is rather longer.

Figure 4:
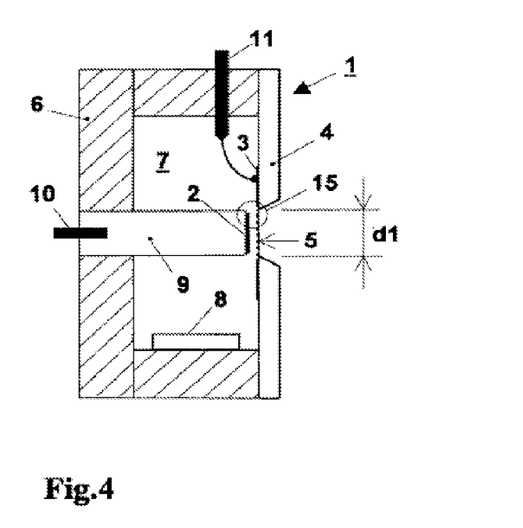
Figure 5:
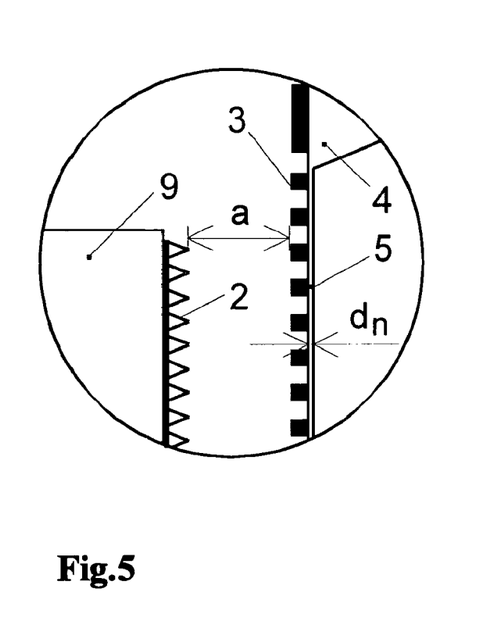
Figure 6:
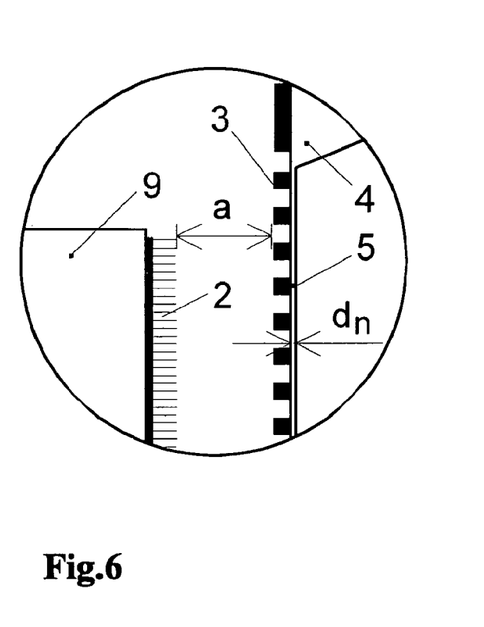
Figure 7:
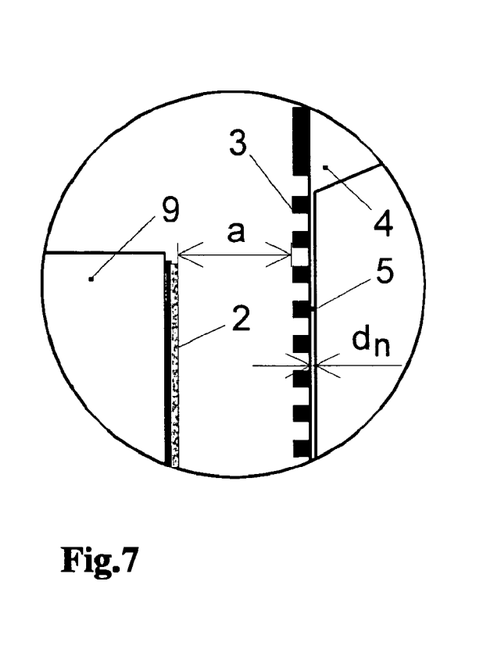

A further implementation is depicted in FIG. 4 as a diode configuration. The field emission cathode disposed areally on the cathode carrier 9 is here brought close at lesser distance a1 to the membrane 5, such that a control grid 12 is not necessary. Several preferred embodiments of field emitter cathodes 2 are depicted in FIGS. 5 to 7 according to the detail segment 15. The field emitter configurations depicted here can be applied in the triode as well as also in the diode configuration, thus with or without control grid 12. FIG. 5 shows a configuration with a microtip field emitter cathode. In this type of cathode 2 in a surface, preferably a plane, a multiplicity of small tips are disposed, which at sufficiently high field strength emit electrons, the microtip field emitter cathode, protected by the membrane 5, having a long service life. In the detail segment according to FIG. 6 the diode configuration according to FIG. 4 is shown in which the field emitter cathode is realized as a carbon nanotube (CNT) field emitter. This type of cathode is comprised of a multiplicity of nanotubes of carbon distributed on a surface, which are highly efficient field emitters. In FIG. 7 the detail segment of the diode configuration according to FIG. 4 shows a field emitter cathode which is formed as a nanostructured surface or as a structured applied field emitter thin film. In this case, for example by etching the surface of a layer or of the carrier material itself, tip- or edge-like structures capable of electron emission are generated from the basic material. The direct use of the carrier material 9, in particular if this is comprised of an Inox material, is herein highly advantageous.

Figure 8:
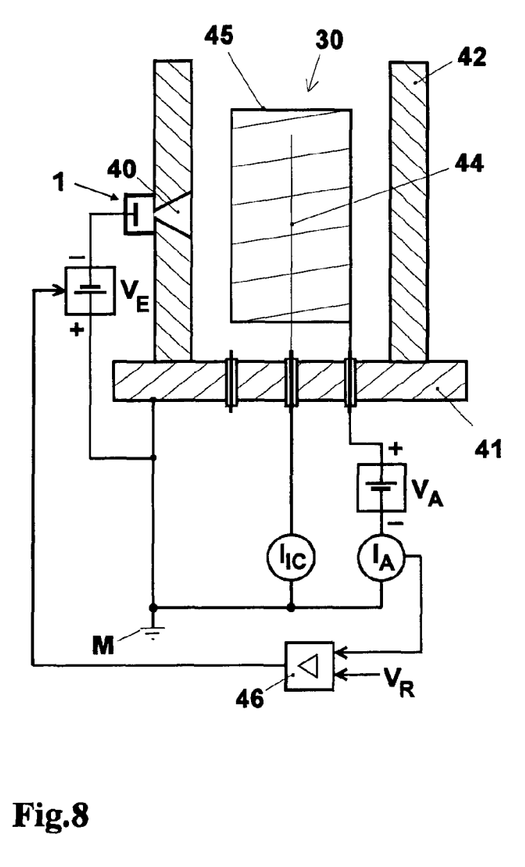
Figure 9:
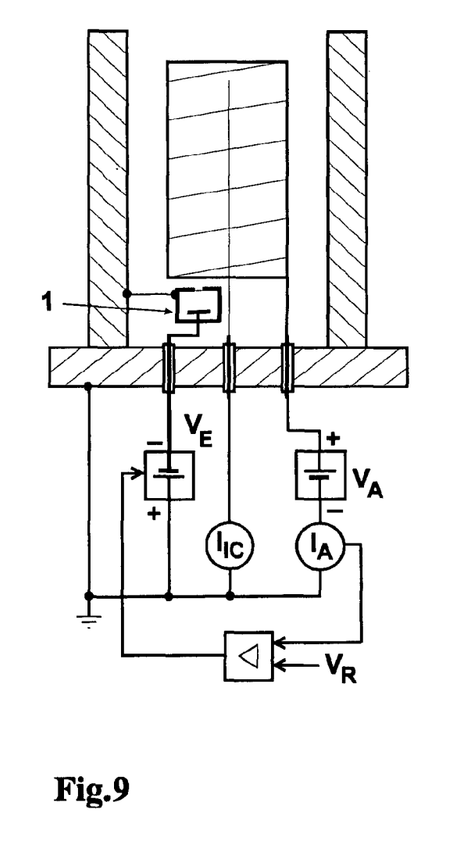
Figure 10:
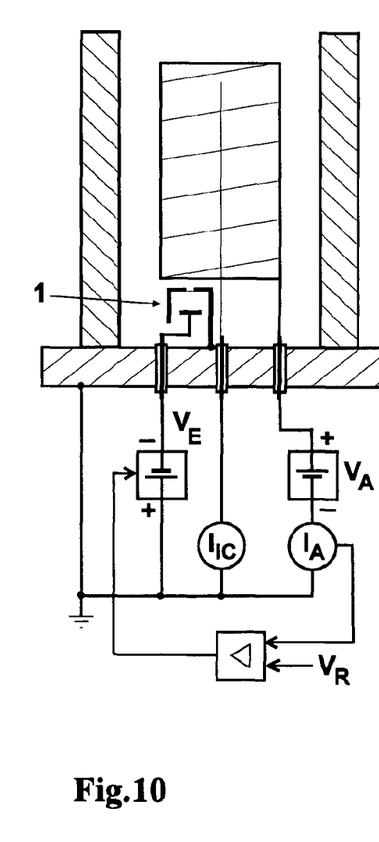

A preferred application of the electron source 1 according to the present invention is depicted in FIGS. 8 to 10 for total pressure vacuum measuring cells schematically and by example. This is here an ionization measuring cell or tube, such as of the type Bayard-Alpert tube or an extractor manometer. The measuring cell is disposed on a base plate 41. This supports the tubular measuring cell housing wall 42, which receives the anode 45 disposed therein in spiraling or grid-form, which anode encompasses the reaction volume or zone 30, with the therein disposed ion collector 44. The electron source 1 according to the invention is disposed laterally on the wall 42 in which an opening 40 is formed for the passage of the electrons. The electrons are consequently injected directly from the membrane 5 of the electron source 1 via the opening 40 into the reaction zone 30 of the measuring cell. Due to the entirely gas-tight encapsulation of the electron source 1, it is protected and no contaminations occur which could disturb the measurement. With the acceleration voltage $V_E$, which is applied between cathode 2 of the electron source 1 and the housing of the measuring cell, of base plate 41 and wall 42, the electrons can be extracted and conducted into the measuring cell. The measuring cell in known manner is operated with an anode voltage $V_A$ and a regulator 46, which by acquiring the anode current $I_A$ regulates it to be constant. The measuring cell includes also the measurement of the ion collector current $I_{IC}$ with appropriate evaluation of the vacuum pressure determination. FIG. 9 shows the vacuum pressure measuring cell with axial disposition of the electron source 1, wherein such source is disposed within the measuring cell and the membrane 5 is directed toward the reaction zone 30. This integrated type of construction is possible since the electron source 1 can be realized with small dimensions. An especially cost-effective type of implementation is shown in FIG. 10, where the electron source housing 6 indirectly communicates via an opening with the vacuum region of the measuring cell. The opening is across from the reaction zone 30 facing away from the measuring cell, such that the electron source housing 6 functions like a screen and protects the interior region of the electron source 1 and also the measuring cell against undesirable effects; however, the electron transmission into the reaction volume or zone 30 via the membrane 5 is ensured. In this implementation of the electron source 1, no additional complexities are necessary for the generation and maintenance of a vacuum 7 within the electron source. However, in this case the complete protection of the electron source 1, for example during a venting, is no longer given.

Figure 11:
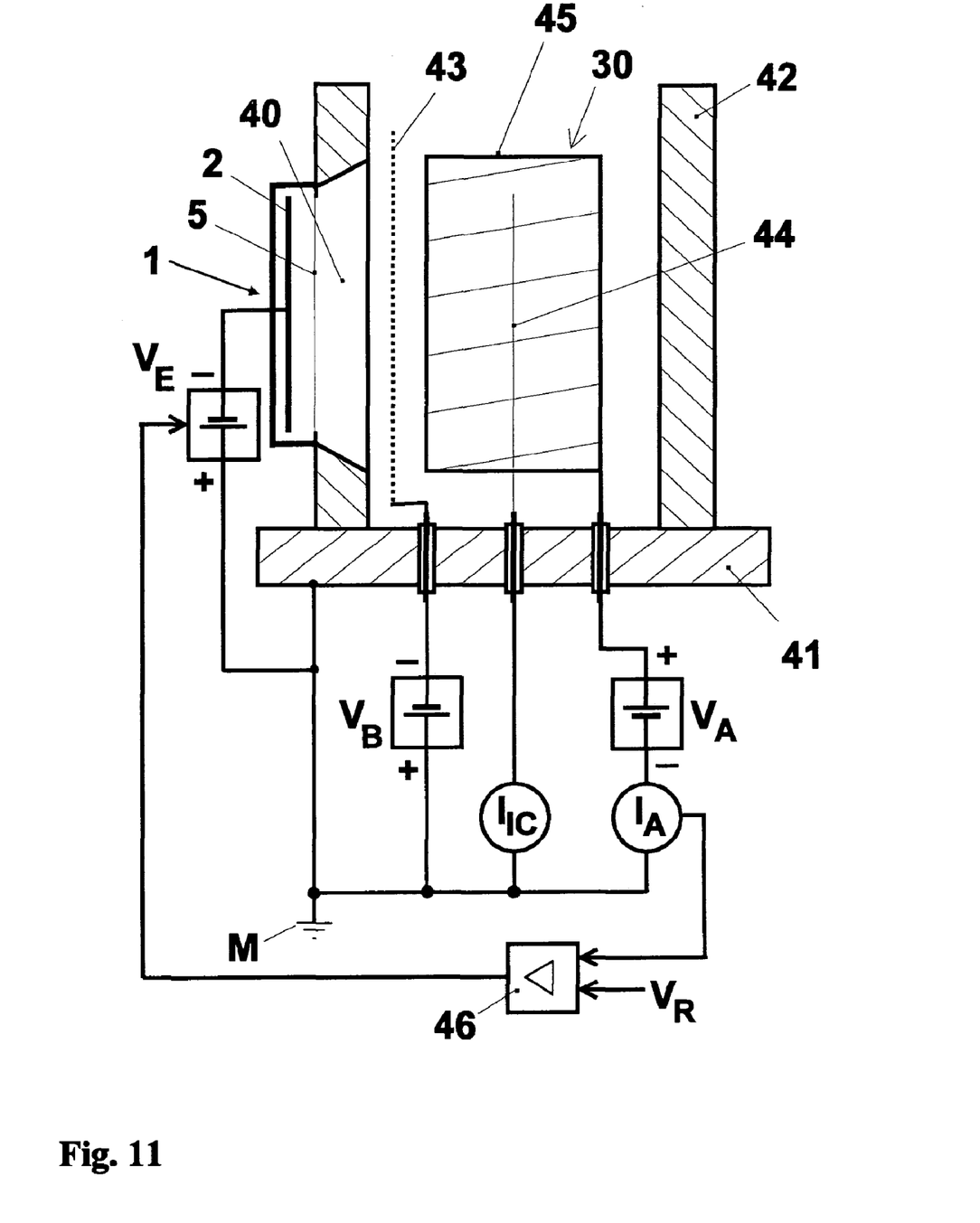

FIG. 11 depicts a further preferred embodiment. Past the nanomembrane 5 or between nanomembrane 5 and reaction zone 30, a decelerating grid 43 is disposed in the vacuum measuring device. By means of a deceleration voltage $V_B$ on the deceleration grid 43 the kinetic energy of the electrons transmitted through the nanomembrane 5 can be lowered so far that a higher ionization probability of the gas molecules in the reaction zone 30, and therewith a higher measuring sensitiy of the vacuum measuring device, for example for expanding the lower vacuum pressure measuring limit, is set.

Figure 12:
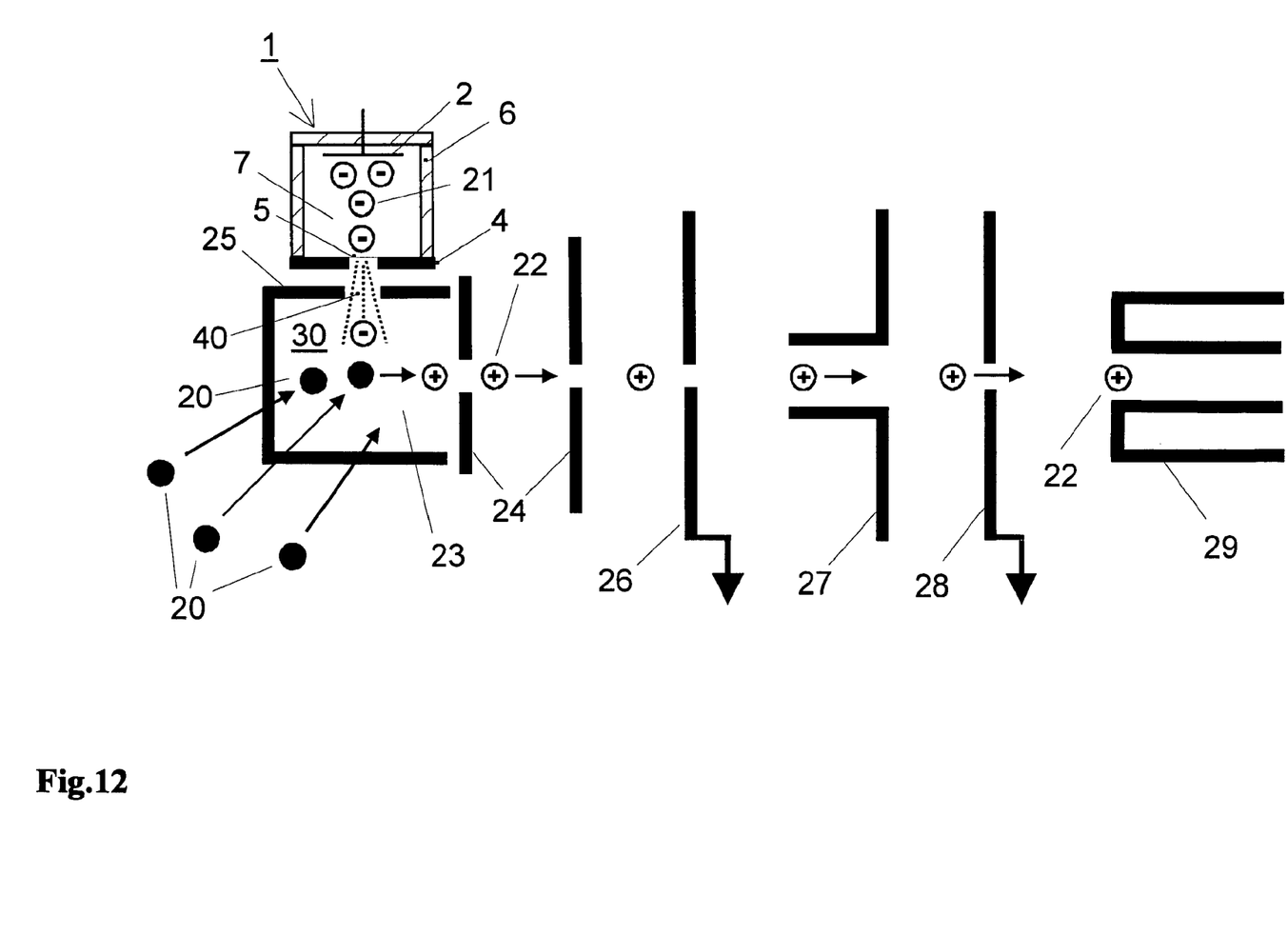

FIG. 12 shows a further preferred application for partial pressure measuring devices, such as mass spectrometers, in section along the longitudinal axis, wherein the electron source 1 is here disposed orthogonally and laterally with respect to the ion source, for the radial feed of the electrons into the ion source, thus the reaction zone 30, of the mass spectrometer. The electrons 21 penetrate through the membrane 5 and are conducted with the electron extraction lens 25, which encompasses the reaction zone 30 like a chamber, through an opening 40 into this zone. In this zone the neutral particles 20 to be measured are ionized through impact ionization and ions 22 are formed. In the wall of this chamber 25 one or several openings 23 are available for introducing the neutral particles 20 to be analyzed. This chamber 30 closed off in the axial direction with an ion extraction lens 24 for the extraction of the formed ions 22 which via further lenses 26, focusing lens 27 and injection aperture 28 are conducted into the analysis system of the mass spectrometer 29. In the case of mass spectrometers the electron source 1 and therewith the electron injection can also take place in the axial direction if the configuration is to be realized especially simply. The radial configuration is, however, preferred due to the better measuring quality. The electron source 1 according to the invention can be applied advantageously in different types of mass spectrometers. A quadrupole mass spectrometer is herein especially suitable, as was described in the present example according to FIG. 11 since the membrane separation of the electron source 1 ensures, in particular, pure conditions which lead to high measuring resolution and reproducibility of the measurements.

The invention claimed is:

1. Vacuum pressure measuring device having a vacuum volume, the device comprising:
    an electron source (1) for generating electrons;
    a reaction zone (30) for the formation of ions (22) through impact ionization, the electron source (1) communicating with the reaction zone (30) via a passage opening (40) for the electrons (21);
    the electron source (1) including an insulating housing (6) having a insulating wall encompassing a vacuum volume (7) containing a vacuum condition, the wall having a membrane carrier (4);
    a nanomembrane (5) supported by the membrane carrier (4) across the passage opening (40) and separating the vacuum volume (7) from the reaction zone (30) and from an outside region outside the housing (6) such that the vacuum volume (7) is gas-tight with respect to the reaction zone (30) and with respect to the outside region, the nanomembrane (5) being at least partly permeable to electrons;
    a cathode (2) in the vacuum volume (7) for the emission the electrons (21); and
    an anode configuration (3) in the proximity of the nanomembrane (5) and operating so that electrons (21) are conducted toward the nanomembrane (5) and at least some of the electrons penetrate the nanomembrane (5), the nanomembrane (5) bordering the vacuum volume of the vacuum pressure measuring device.

2. Vacuum pressure measuring device as claimed in claim 1, wherein the vacuum volume (7) is closed vacuum-tight on all sides by the housing (6) and includes therein an independent vacuum and that therein, or thereon, a getter (8) is disposed for maintaining the vacuum condition.

3. Vacuum pressure measuring device as claimed in claim 1, wherein the vacuum volume (7) is closed vacuum-tight on all sides by the housing (6), the housing (6) includes a connection (100) and a vacuum pump system (104) in the connection, for the continuous or discontinuous maintenance of the vacuum condition.

4. Vacuum pressure measuring device as claimed in claim 1, wherein the housing (6) includes an opening by which the vacuum volume (7) communicates with the vacuum volume of the vacuum measuring device.

5. Vacuum pressure measuring device as claimed in claim 1, wherein the cathode (2) consists of a thermionic cathode.

6. Vacuum pressure measuring device as claimed in claim 5, wherein the cathode (2) is an indirectly heated cathode configuration.

7. Vacuum pressure measuring device as claimed in claim 1, wherein the cathode is a field emission cathode (2).

8. Vacuum pressure measuring device as claimed in claim 7, including a control grid (12) disposed in front of the field emission cathode (2).

9. Vacuum pressure measuring device as claimed in claim 8, wherein the field emission cathode (2) has a nanostructured field emission surface.

10. Vacuum pressure measuring device as claimed in claim 9, wherein the field emission surface is a nanostructured surface which includes a field emission film (2), which film is deposited on a cathode carrier (9).

11. Vacuum pressure measuring device as claimed in claim 9, wherein the nanostructured field emission surface is formed from the surface of a metallic solid material of the cathode carrier.

12. Vacuum pressure measuring device as claimed in claim 8, wherein the field emission cathode (2) is a microtip field emission cathode.

13. Vacuum pressure measuring device as claimed in claim 8, wherein the field emission cathode (2) is a carbon nanotube field emitter cathode.

14. Vacuum pressure measuring device as claimed in claim 8, wherein the field emission cathode (2) has a nanostructured field emission surface and wherein the vacuum volume (7) is closed vacuum-tight on all sides by the housing (6) and includes therein an independent vacuum and that therein, or thereon, a getter (8) is disposed for maintaining the vacuum condition.

15. Vacuum pressure measuring device as claimed in claim 8, wherein the field emission cathode (2) has a nanostructured field emission surface and wherein the vacuum volume (7) is closed vacuum-tight on all sides by the housing (6), the housing (6) including a connection (100) and a vacuum pump system (104) in the connection for the continuous or discontinuous maintenance of the vacuum condition.

16. Vacuum pressure measuring device as claimed in claim 1, wherein the nanomembrane (5) is comprised of a ceramic.

17. Vacuum pressure measuring device as claimed in claim 16, wherein the nanomembrane (5) is selected from the group consisting of the ceramics $Si_3N_4$, $SiO_2$, $Al_2O_3$, $ZrO_2$, $Y_2O_3$, SiC and mixed forms thereof.

18. Vacuum pressure measuring device as claimed in claim 16, wherein the nanomembrane (5) is comprised of aluminum oxide.

19. Vacuum pressure measuring device as claimed in claim 1, wherein the nanomembrane (5) is comprised of a metal foil.

20. Vacuum pressure measuring device as claimed in claim 1, wherein the nanomembrane (5) is comprised of a steel foil.

21. Vacuum pressure measuring device as claimed in claim 1, wherein the thickness ($d_n$) of the nanomembrane (5) is in the range of 25 to 500 nm.

22. Vacuum pressure measuring device as claimed in claim 1, wherein the areal dimension of the nanomembrane (5) is in the range of 0.1 to 40.0 $mm^2$.

23. Vacuum pressure measuring device as claimed in claim 1, wherein the area of the nanomembrane (5) is in the range of 0.1 to 1.0 $mm^2$ and the maximal dimension of the nanomembrane (5), for the purpose of withstanding atmospheric pressure during a venting of the reaction zone (30), in one direction does not exceed 0.7 mm.

24. Vacuum pressure measuring device as claimed in claim 1, wherein the shape of the area of the nanomembrane (5) is substantially adapted to the shape of the cathode (2).

25. Vacuum pressure measuring device as claimed in claim 1, wherein between the cathode (2) and the anode configuration (3) an electric voltage is applied of a magnitude in the range of 5 kV to 50 kV in order to accelerate the electrons (21) so that at least some of the electrons penetrate through the nanomembrane (5).

26. Vacuum pressure measuring device as claimed in claim 1, wherein the electron source configuration (1) with the nanomembrane (5) has an electron transmission through the nanomembrane of more than 90% if the acceleration voltages are more than 10 kV.

27. Vacuum pressure measuring device as claimed in claim 1, wherein in the vacuum volume (7) of the electron source (1) there is a vacuum of a magnitude within the range of $10^{-1}$ mbar to $10^{-8}$ mbar.

28. Vacuum pressure measuring device as claimed in claim 1, wherein the vacuum measuring device is a total pressure measuring cell or tube.

29. Vacuum pressure measuring device as claimed in claim 1, wherein the vacuum measuring device is a partial pressure measuring device.

30. Vacuum pressure measuring device as claimed in claim 1, wherein the cathode is a thermionic cathode (2) and is a cost-effective high-power standard cathode from the field of vacuum tube technology.

31. Vacuum pressure measuring device as claimed in claim 1, wherein, past the nanomembrane (5) is disposed a deceleration grid (43) between the nanomembrane (5) and the reaction zone (30) in the vacuum measuring device.

32. Vacuum pressure measuring device as claimed in claim 1, wherein the area of the nanomembrane (5) is in the range of 0.3 to 0.7 $mm^2$ and the maximal dimension of the nanomembrane (5), for the purpose of withstanding atmospheric pressure during a venting of the reaction zone (30), in one direction does not exceed 0.5 mm.

* * * * *